(12) United States Patent
Sherman et al.

(10) Patent No.: US 11,271,429 B2
(45) Date of Patent: Mar. 8, 2022

(54) SYSTEM FOR WIRELESS POWER CHARGING

(71) Applicant: POWERMAT TECHNOLOGIES LTD., Petah Tikva (IL)

(72) Inventors: Itay Sherman, Hod Hasharon (IL); Ilya Gluzman, Holon (IL); Elieser Mach, Rosh Tzurim (IL); Amir Salhuv, Nes Ziona (IL); Sharon Ben-Itzhak, Rehovot (IL); Aya Kantor, Tel Aviv (IL)

(73) Assignee: POWERMAT TECHNOLOGIES LTD., Petah Tikva (IL)

( * ) Notice: Subject to any disclaimer, the term of this patent is extended or adjusted under 35 U.S.C. 154(b) by 258 days.

(21) Appl. No.: 16/304,879

(22) PCT Filed: Mar. 7, 2018

(86) PCT No.: PCT/IL2018/050258
§ 371 (c)(1),
(2) Date: Nov. 27, 2018

(87) PCT Pub. No.: WO2018/163170
PCT Pub. Date: Sep. 13, 2018

(65) Prior Publication Data
US 2020/0328617 A1      Oct. 15, 2020

Related U.S. Application Data

(60) Provisional application No. 62/614,422, filed on Jan. 7, 2018, provisional application No. 62/584,919, filed
(Continued)

(51) Int. Cl.
*H02J 50/12* (2016.01)
*H02J 50/80* (2016.01)
(Continued)

(52) U.S. Cl.
CPC ............... *H02J 50/12* (2016.02); *H02J 7/02* (2013.01); *H02J 50/50* (2016.02); *H02J 50/80* (2016.02)

(58) Field of Classification Search
CPC ........................................................ H02J 50/12
(Continued)

(56) References Cited

U.S. PATENT DOCUMENTS

| 9,126,490 B2 | 9/2015 | Cook et al. |
| 2008/0079392 A1 | 4/2008 | Baarman et al. |

(Continued)

FOREIGN PATENT DOCUMENTS

| WO | 2011/097608 A2 | 8/2011 |
| WO | 2012058466 A1 | 5/2012 |

(Continued)

OTHER PUBLICATIONS

Extended European Search Report issued in European Application No. 18160589.0, dated May 24, 2018, 8 pages.
(Continued)

*Primary Examiner* — Edward Tso
*Assistant Examiner* — Ahmed H Omar
(74) *Attorney, Agent, or Firm* — Volpe Koenig

(57) ABSTRACT

According to a first aspect of the present disclosed subject matter, a dynamic calibration method in a system comprising a relay, having a coil, adapted to inductively transfer power for charging a device and a transmitter, having a coil and a controller configured to inductively transmit to the relay the power for charging the device, wherein the transmitter and the relay are separated by a medium, the method comprising: determining operating parameters selected from a group consisting of minimal and maximal operating frequency; direction of power increase relative to operating frequency; minimal and maximal duty cycle; minimal and
(Continued)

maximal operating amplitude; and any combination thereof; wherein the operating parameters and a ping frequency are determined based on dynamic measurements of the transmitter operation and calculations executed by the controller during the calibration.

13 Claims, 4 Drawing Sheets

Related U.S. Application Data on Nov. 13, 2017, provisional application No. 62/535,987, filed on Jul. 24, 2017, provisional application No. 62/467,903, filed on Mar. 7, 2017.

(51) Int. Cl.
*H02J 50/50* (2016.01)
*H02J 7/02* (2016.01)

(58) Field of Classification Search
USPC .......................................................... 320/108
See application file for complete search history.

(56) References Cited

U.S. PATENT DOCUMENTS

| | | | |
|---|---|---|---|
| 2008/0157603 A1 | 7/2008 | Baarman et al. | |
| 2009/0096413 A1 | 4/2009 | Partovi et al. | |
| 2009/0174263 A1 | 7/2009 | Baarman et al. | |
| 2010/0109445 A1* | 5/2010 | Kurs ...................... | B60L 50/20 307/104 |
| 2010/0181841 A1 | 7/2010 | Azancot et al. | |
| 2011/0037322 A1 | 2/2011 | Kanno | |
| 2011/0133569 A1 | 6/2011 | Cheon et al. | |
| 2011/0227530 A1 | 9/2011 | Karalis et al. | |
| 2011/0291790 A1 | 12/2011 | Okumura et al. | |
| 2012/0063505 A1 | 3/2012 | Okamura et al. | |
| 2012/0193993 A1 | 8/2012 | Azancot et al. | |
| 2012/0235503 A1 | 9/2012 | Kesler et al. | |
| 2013/0015699 A1 | 1/2013 | Mita | |
| 2013/0020862 A1* | 1/2013 | Miller ..................... | H02J 7/025 307/9.1 |
| 2013/0026851 A1 | 1/2013 | Taguchi | |
| 2013/0062965 A1 | 3/2013 | Chernokalov et al. | |
| 2013/0094598 A1 | 4/2013 | Bastami | |
| 2013/0249479 A1 | 9/2013 | Partovi | |
| 2014/0015329 A1 | 1/2014 | Widmer et al. | |
| 2014/0015330 A1 | 1/2014 | Byun et al. | |
| 2014/0184150 A1 | 7/2014 | Walley | |
| 2014/0239735 A1 | 8/2014 | Abe et al. | |
| 2014/0265617 A1* | 9/2014 | Roy ........................ | H02J 50/12 307/104 |
| 2015/0061585 A1 | 3/2015 | Obayashi et al. | |
| 2015/0249484 A1 | 9/2015 | Mach et al. | |
| 2015/0303995 A1 | 10/2015 | Staring et al. | |
| 2015/0372496 A1 | 12/2015 | Lee et al. | |
| 2016/0056637 A1 | 2/2016 | Hwang | |
| 2016/0056664 A1 | 2/2016 | Partovi | |
| 2016/0181818 A1 | 6/2016 | Joye et al. | |
| 2016/0181822 A1 | 6/2016 | Yang et al. | |
| 2016/0254701 A1 | 9/2016 | Tsuda et al. | |
| 2016/0329753 A1 | 11/2016 | Gluzman et al. | |
| 2017/0018977 A1* | 1/2017 | Van Wageningen .... | H02J 50/12 |
| 2017/0054330 A1 | 2/2017 | You et al. | |
| 2017/0163070 A1 | 6/2017 | Lawrenson et al. | |
| 2017/0353046 A1 | 12/2017 | Chen et al. | |
| 2020/0287419 A1 | 9/2020 | Sherman et al. | |
| 2020/0287425 A1 | 9/2020 | Sherman et al. | |
| 2020/0321806 A1 | 10/2020 | Sherman et al. | |
| 2020/0328617 A1 | 10/2020 | Sherman et al. | |

FOREIGN PATENT DOCUMENTS

| | | |
|---|---|---|
| WO | 2013/036947 A2 | 3/2013 |
| WO | 2013056234 A2 | 4/2013 |
| WO | 2015150107 A1 | 10/2015 |
| WO | 2017012979 A1 | 1/2017 |
| WO | 2017134101 A1 | 8/2017 |

OTHER PUBLICATIONS

Extended European Search Report issued in European Application No. 18160590.8, dated May 11, 2018, 8 pages.
Extended European Search Report issued in European Application No. 18160592.4, dated Jun. 4, 2018, 8 pages.
Extended European Search Report issued in European Application No. 18160593.2, dated May 25, 2018, 8 pages.
International Preliminary Report issued in International Application No. PCT/IL2018/050256, dated Sep. 19, 2019, 6 pages.
International Preliminary Report issued in International Application No. PCT/IL2018/050258, dated Sep. 19, 2019, 6 pages.
International Preliminary Report issued in International Application No. PCT/IL2018/050260, dated Sep. 19, 2019, 6 pages.
International Preliminary Report issued in International Application No. PCT/IL2018/050266, dated Sep. 19, 2019, 6 pages.
International Search report and Written Opinion issued in International Application No. PCT/IL2018/050256, dated Jul. 4, 2018, 26 pages.
International Search report and Written Opinion issued in International Application No. PCT/IL2018/050258, dated Jul. 5, 2018, 24 pages.
International Search report and Written Opinion issued in International Application No. PCT/IL2018/050260, dated Jul. 5, 2018, 10 pages.
International Search report and Written Opinion issued in International Application No. PCT/IL2018/050266, dated Jul. 2, 2018, 24 pages.
"Wireless power transfer,"https://en.wikipedia.org/wiki/Wireless_power_transfer, Available at: https://web.archive.org/web/20170302161952/https://en.wikipedia.org/wiki/Wireless_power_transfer (Mar. 2, 2017).
Notice of Opposition to a European Patent dated Jul. 14, 2020 for European Patent Application No. EP 18160592.4.

* cited by examiner

SYSTEM FOR WIRELESS POWER CHARGING

CROSS-REFERENCE TO RELATED APPLICATIONS

The present application is a National Phase filing under 35 U.S.C. § 371 of International Patent Application No. PCT/IL2018/050258, filed Mar. 7, 2018, which is based upon and claims under 35 U.S.C. § 119(e) the benefit of the priority dates of U.S. Provisional Patent Application Ser. No. 62/467,903, filed Mar. 7, 2017; U.S. Provisional Patent Application Ser. No. 62/535,987, filed Jul. 24, 2017; U.S. Provisional Patent Application Ser. No. 62/584,919, filed Nov. 13, 2017; and U.S. Provisional Patent Application Ser. No. 62/614,422, filed Jan. 7, 2018, each of which is expressly incorporated herein by reference for all purposes in its entirety.

TECHNICAL FIELD

The present disclosed subject matter relates to wireless power charging systems. More particularly, the present disclosed subject matter relates to induction charging through medium and methods for self-calibration.

BACKGROUND

Growing demand for wireless power charging systems, led to dramatic deployments increase, in a wide variety of venues, raises the need for increasing the effective charging distance between a transmitter and a receiver. Commercially available systems are limited to a maximum distance of approx. 10 millimeters between a transmitter and a receiver of such system.

Wireless power charging systems are usually deployed in public facilities such as restaurants, coffee shops, airports, bus stations; train stations, banks, schools, libraries, hotels, official building, or the like. Typically, the systems are installed on top of surfaces, such as tables, bars, or the like that are accessible to users, thus require decorative appearance and hazards free installation. To meet these requirements on one hand and distance limitations on the other, requires wiring to be routed on top of the surface as well as drilling the surface to make for the distance limitation. In some cases, the transmitter of such commercially available systems can be installed inside the cutout hole in the surface, which complicate the installation and raise its cost, on top of damaging the customer's furniture.

Clearly, such commercially available solutions are not desired in the consumers marketplace. Moreover, the wireless power charging level of these available solutions is limited for charging handheld devices requiring less than 15 watts.

BRIEF SUMMARY

According to a first aspect of the present disclosed subject matter, a dynamic calibration method in a system comprising a relay, having a coil, adapted to inductively transfer power for charging a device and a transmitter, having a coil and a controller configured to inductively transmit to the relay the power for charging the device, wherein the transmitter and the relay are separated by a medium, the method comprising: determining operating parameters selected from a group consisting of minimal and maximal operating frequency; direction of power increase relative to operating frequency; minimal and maximal duty cycle; minimal and maximal operating amplitude; and any combination thereof; wherein the operating parameters and a ping frequency are determined based on dynamic measurements of the transmitter operation and calculations executed by the controller during the calibration.

In some exemplary embodiments, the calibration further comprises determining a coupling factor between the coil of the transmitter and the coil of the relay and their joint resonance frequencies.

In some exemplary embodiments, the operating parameters are determined based on the coupling factor and a main resonance frequency.

In some exemplary embodiments, the measurements further comprises operating the transmitter while sweeping the operating frequency and measuring an output AC current for each operating frequency.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.
In the Drawings.

DETAILED DESCRIPTION

Figure 1:
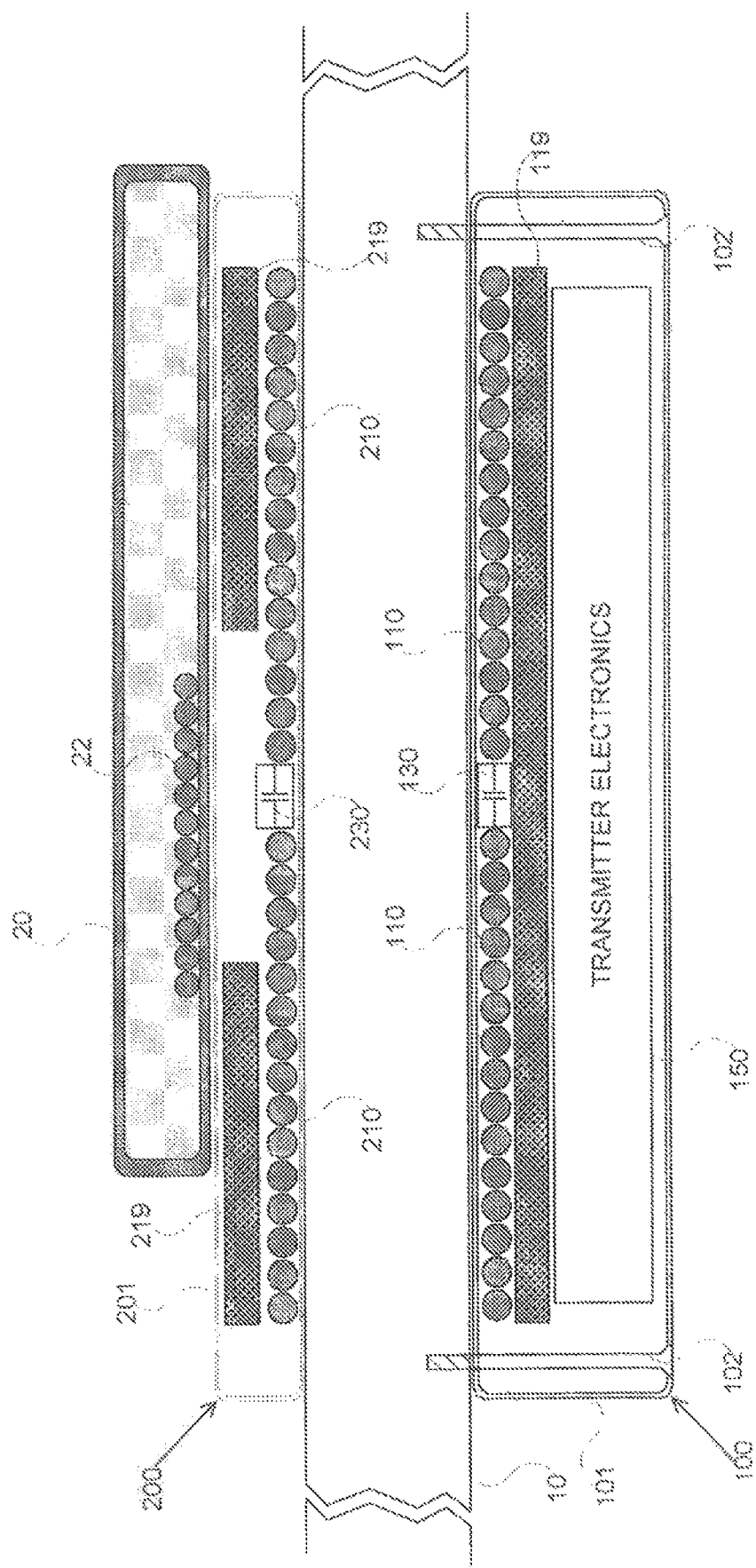
FIG. 1 shows a cross-section view of an installation of wireless power charging system, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Referring now to FIG. 1 showing a cross-sectional view of an installation of wireless power charging system, in accordance with some exemplary embodiments of the disclosed subject matter. The wireless power charging system may be comprised of a transmitter (Tx) 100 and at least one relay 200.

In some exemplary embodiments, Tx 100 may be mounted on one side of a medium 10, whereas the relay 200 may be mounted on the opposite side of the medium 10. The medium 10 may be made of any material that doesn't conduct electricity, such as for example wood, plastic granite, marble, a combination thereof, or the like. It will be noted that in the present disclosure, medium 10 refers to surfaces, such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec) 150; all incorporated inside a transmitter enclosure (Tx enclosure) 101 that may be secured to medium 10 by fasteners 102.

In some exemplary embodiments, the relay 200 may comprise a relay coil (Lr) 210; a relay ferrite 219, and a relay capacitor (Cr) 230; all incorporated in a relay enclosure 201 that may be secured to an opposite side of medium 10. Enclosure 201 may have a shape and form factor of a mat, a pad, a saucer, a coaster, a combination thereof, or the like. The enclosure 201 of relay 200 can be secured to medium 10 by glue or any other method, which guarantee that relay 200 and Tx 100 overlap one another from both sides of medium 10. It will be noted that, relay 200 and Tx 100 overlap each other so that Lt 110 and Lr 210 shall be substantially aligned, to face one another, for optimizing the inductance between the two, as depicted in FIG. 1.

In some exemplary embodiments, Tx 100, with is powered by power supply (PS) 160 (not shown), can be configured to utilize relay 200 for inductively (wirelessly) charge device 20 placed on relay 200. Device 20 may be a user's device such as a tablet, a laptop a Smartphone, or any chargeable mobile handsets; which comprise a built-in coil 22 configured to receive inductive power and charge a battery of the device 20. It should be noted that, the built-in coil 22 refers to standard receiver's coils of the devices listed above, typically this standard receiver's coils have a diameter of approximately 40 millimeters.

It should be noted that, the terminology of components Lt 110, Lr 210/Lr 310 and coil 22 in the present disclosure correspond to: first Tx coil, second Tx coil and Rx coil, respectively, of the related provisional patent applications.

Similar to Lr 210 and Lt 110, coil 22 and Lr 210 may substantially face and overlap each other, i.e. centers of coil 22 and Lr 210 can be aligned, in order to meet one of the effective charging criteria's. To ensure the alignment, enclosure 201 of the relay 200 can be marked with a layout that indicates to a user, the optimal place for positioning device 20 on top of relay 200 so as to gain effective charging. However, the wireless power charging system may be adapted to provide power charging even if device 20 is not precisely positioned on top of relay 200 as depicted in FIG. 1.

In some exemplary embodiments, both Lr 210 and Lt 100 may be flat spiral air core coils, having a diameter greater than 100 mm. The utilization of such large coils allows for relatively high coupling between Lr 210 and Lt 100 despite a thickness equal to or greater than 30 millimeters of medium 10. In the embodiment depicted in FIG. 1, the coupling factor between Lr 210 and Lt 100 may be greater than 0.25. The coupling between typical coil 22 and Lr 210 may be greater than 0.15 in the embodiment depicted in FIG. 1.

In some exemplary embodiments, Tx 100 comprises a transmitter ferrite (Tx-ferrite) 119. Tx-ferrite 119 can be a layer made of ferrite material with suitable magnetic characteristics of permeability & core losses. One technical reason for utilizing the Tx-ferrite 119 is providing a buffer for protecting Tx-electronics 150 from inductive energy. Another technical reason for utilizing the Tx-ferrite 119 can be to increase the magnetic field facing relay 200; thus, the inductance of the Lt 110. Tx-ferrite 119 properties such as thicknesses, flexibility, fragility a combination thereof, or the like can be dictated by an application in which the system of the present disclosure is provided. For example, the thickness and the material from which the medium 10 is made of. Since Lt 110 may have a shape of a circle, the shape of Tx-ferrite 119 may also be a circle, having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 200 may comprise a relay ferrite 219. Relay ferrite 219 may be a layer made of ferrite material similar to Tx-ferrite 119. One technical reason for utilizing the Relay ferrite 219 is to provide a buffer for protecting the electronic circuitry of device 20 from inductive energy. Another technical reason for utilizing the relay ferrite 219 may be to increase the magnetic field facing the Tx100; thus, the inductance of Lr 210. Relay ferrite 219 possesses properties similar to the properties of Tx-ferrite 119. Since Lr 210 can have a shape of a circle, the shape of relay ferrite 219 can also be a circle having a diameter equal to or bigger than the Lr 210 external diameter. Alternatively, Relay ferrite 219 may have a shape of any geometric plane figure as long as Lr 210 external diameter is an inscribed circle within the geometric plane figure.

It should be noted that relay ferrite 219 requires a cutout situated at its center. The size of the cutout can be equal to or slightly larger than an external diameter of a typical receiver coil of a chargeable device, such as coil 22 of device 20. The shape of the cutout may be a circle or any geometric surface that surrounds coil 22 shape in order to allow passage of magnetic flux between Lr 210 and coil 22.

In some exemplary embodiments of the disclosed subject matter, at least one resonance capacitor (Ct) 130 can be connected in series to Lt 110 and at least one resonance capacitor (Cr) 230 can be connected in series to Lr 210. The resonant capacitors are placed inside the inner diameter space of each coil accordingly. Alternatively, the resonant capacitors can be placed next to the outer diameter space of each coil accordingly, or elsewhere within the respected enclosure.

The relay ferrite 219 of the present disclosure increases the coupling factor of coil 22 and Lr 210 to better simulate a behavior of a coil 22 with commercially available standard transmission coil, and also reduces any direct coupling from Lt 110 to coil 22, which is not desired in the system of the present disclosure. In addition, the resonance capacitors of both the Tx 100 and relay 200 are intended to stabilize the system operational point, dependency of coil 22 loads and allow high efficiency in power transfer. In some exemplary embodiments, the resonance frequency of Lt 110 and Ct 130, (i.e. Tx 100 LC circuit), can be set to be significantly lower than the resonance frequency of a typical coil such as coil 22 (approximately 100 kHz) and substantially lower than the resonance frequency of Lr 210 and Cr 230 (i.e. relay 200 LC circuit).

In some exemplary embodiments, a combination of the Tx 100 and the relay 200 LC circuits, when no load is present, may form two distinct resonance frequencies, hereinafter, joint resonance frequencies (JRF). The first resonance frequency of the JRF, may be adjacent to Tx 100 LC circuit's resonance frequency; however, lower in any case. The second resonance frequency of JRF may be adjacent to relay 200 LC circuit's resonance frequency, however higher in any case. It should be noted that the phrase "a combination of the Tx 100 and the relay 200 LC circuits" refers in the present disclosure to a state where Tx 100 and relay 200 face each other, such as depicted in FIG. 1 and power is applied to the Tx 100. It should also be noted that the second resonance frequency, i.e. higher resonance frequency, shall be regarded as the present disclosure system main resonance frequency (MRF).

The resonance frequency of Tx 100 LC circuit and relay 200 LC circuit are designed in such a way that their JRF, with no Coil 22 on them, is tuned to be a specific range (typically 20-50 kHz) lower than the desired maximal operational frequency of the Tx 100 and is higher than coil 22 resonance frequency.

As an example, the inductance of Lt 110 may be approximately 30 µH; the capacitance of Ct 130 may be approximately 290 µF which provides a Tx 100 LC circuit's resonance frequency of approximately 54 kHz. Whereas, the inductance of Lr 210 may be approximately 60 µH; the capacitance of Ct 130 may be approximately 37.5 nF which provides a relay 200 LC circuit's resonance frequency of approximately 106 kHz. In such preferred exemplary embodiment, the system MRF may be 117 kHz (i.e. higher than 106 kHz of the relay 200 LC circuit's resonance frequency) providing that the gap between installed relay 200 and Tx 110 may be approximately 30 millimeters. Also, the outer diameter of Lt110 and Lr210 may be approximately 125 millimeters, whereas the cutout diameter in ferrite 219 may be approximately 55 millimeters.

In some exemplary embodiments, an operating frequency (OPF) may range between 121 kHz-140 kHz, where the lower OPF of the range may be 4 kHz higher than the MRF, i.e. 117 kHz. and maximal frequency may be 5 kHz lower than a regulatory limit, i.e. 145 kHz. Alternatively, the maximal OPF may be set below the MRF and the regulatory maximal frequency limit. For an installation having similar coils as the example described above, with a medium 10 thickness of 0.5", the MRF may be at 140 kHz. Thus, the operational range may be set to 115 kHz-136 kHz, were the maximal frequency is 4 kHz lower than the MRF and lower than the regulatory limit.

It will be understood that the system of the present disclosed avoids operation at resonance frequencies. The preferred OPF of the present disclosure system may be at a range of frequencies that are shifted to a frequency either lower or higher than the main resonance frequency (MRF).

Figure 2:
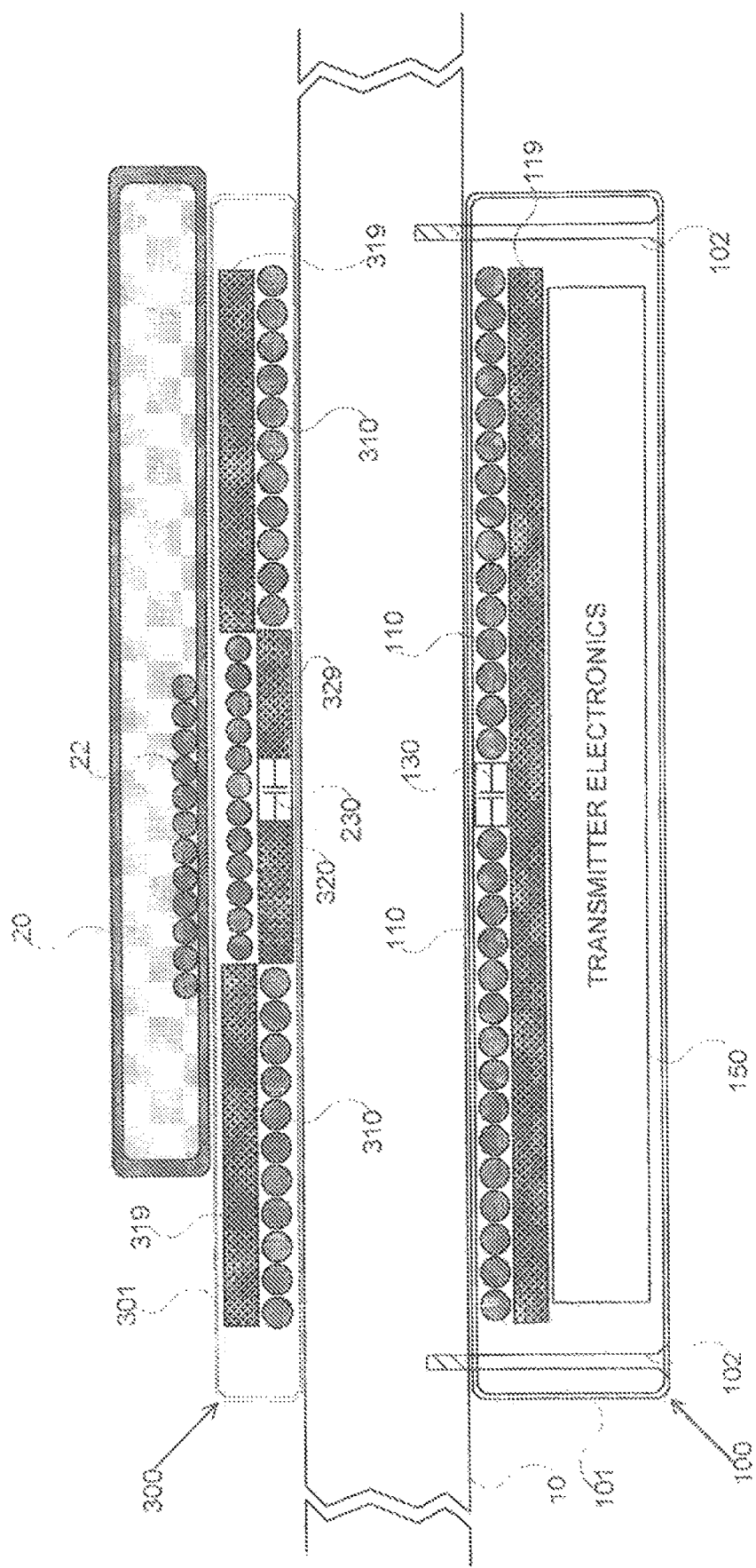
FIG. 2 shows a cross-section view of an installation of another wireless power charging system, in accordance with some exemplary embodiments of the disclosed subject matter.

Referring now to FIG. 2 showing a cross-sectional view of an installation of another wireless power charging system, in accordance with some exemplary embodiments of the disclosed subject matter.

In some exemplary embodiments, Tx 100 may be mounted on one side of a medium 10, whereas the relay 300 may be mounted on the opposite side of the surface 10. The medium 10 can be made of any material that doesn't conduct electricity, such as for example wood, plastic granite, marble, a combination thereof, or the like. It will be noted that in the present disclosure, medium 10 refers to surfaces such as tables, desks, bars, or the like that are accessible to users in public venues. For example: restaurants, coffee shops, airports, bus stations; train stations, banks, schools, libraries, hotels, official building, or the like.

In some exemplary embodiments, the Tx 100 comprises a transmitter coil (Lt) 110; a transmitter capacitor (Ct) 130; a transmitter ferrite (Tx-ferrite) 119, and a transmitter electronics (Tx-elec) 150; all incorporated inside a transmitter enclosure (Tx enclosure) 101 that is secured to medium 10 by fasteners 102.

In some exemplary embodiments, the relay 300 comprises a relay coil (Lr) 310; a second relay coil (sLr) 320; a relay ferrite 319; a second relay ferrite 329 and a relay capacitor (Cr) 330; all incorporated in a relay enclosure 301 that may be secured to an opposite side of medium 10. Enclosure 301 can have a shape and form factor of a mat, a pad, a saucer, a coaster, a combination thereof, or the like. The relay 300 enclosure 301 can be secured to medium 10 by glue or any other method that guarantee that relay 300 and Tx 100 overlap to one another from both sides of medium 10. It will be noted that relay 300 and Tx 100 overlap each other so that Lt 110 and Lr 310 shall be substantially aligned so as to face one another, for optimizing the inductance between the two, as depicted in FIG. 2.

In some exemplary embodiments, Tx 100 is powered by power supply (PS) 160 (not shown in FIG. 2, shown in FIG. 3), may be configured to utilize relay 300 for inductively (wirelessly) charge device 20 placed on relay 300. Device 20 may be a user's device such as a tablet, a laptop a Smartphone, or any chargeable mobile handsets, that comprise a built-in coil 22 configured to receive inductive power and charge a battery of the device 20.

In some exemplary embodiments of the disclosed subject matter, relay 300 may further comprise a secondary relay coil sLr 320 that can be electrically connected in series with Lr 310. Instead, Lr 310 can be arranged in two parts that are situated in two planer heights, wherein the inner coil (i.e. sLr 320) or alternatively part of Lr 310 is elevated compared to the outer part of Lr 310 that face Lt 110.

Coil 22 and sLr320 can substantially face and overlap each other, i.e. centers of coil 22 and sLr 320 are align in order to meet one of the effective charging criteria's. For alignment, enclosure 301 of the relay 300 may be marked with a layout that indicates to a user the optimal place for positioning device 20 on top of relay 300 in order to gain effective charging. However, the wireless power charging system may be adapted to provide power charging even if device 20 is not precisely positioned on top of relay 300 as depicted in FIG. 2.

In some exemplary embodiments, both Lr 310 and Lt 100 may be flat spiral air core coils having a diameter greater than 100 mm, while sLr 320, also having a flat spiral air core coil, may have a smaller diameter that suits typical receiver's coils such as coil 22. The utilization of such large coils allows relatively high coupling between Lr 310 and Lt 100 in order to overcome a thickness equal to or greater than 30 mm of medium 10. In the embodiment depicted in FIG. 2, the coupling factor between Lr 310 and Lt 100 may be greater than 0.25, for medium thickness of up to 30 millimeters. The coupling between typical coil 22 and sLr 320 may be greater than 0.15 in the embodiment depicted in FIG. 2.

It should be noted that sLr 320 may not be directly influenced by Lt 110 because the second relay ferrite 329 blocks the magnetic field (to be described in detail further below); however, the same current induced to Lr 310 flows through sLr 320, since Lr 310 and sLr 320 are connected in series.

In some exemplary embodiments, Tx 100 may comprise a transmitter ferrite (Tx-ferrite) 119. Tx-ferrite 119 may be a layer made of ferrite material with suitable magnetic characteristics of permeability & core losses. One technical reason for utilizing the Tx-ferrite 119 may be to provide a buffer for protecting the Tx-elec. 150 from inductive energy. Another technical reason for utilizing the Tx-ferrite 119 may be to increase the magnetic field facing relay 300, and thus the inductance of Lt 110. Tx-ferrite 119 properties such as thicknesses, flexibility, fragility a combination thereof, or the like may be dictated by an application in which the system of the present disclosure may be provided. For example, the thickness and the material from which the medium 10 is made of. Since Lt 110 may have a shape of a circle, the shape of Tx-ferrite 119 may also be a circle having a diameter equal to or bigger than the Lt 110 external diameter. Alternatively, Tx-ferrite 119 may have a shape of any geometric plane figure as long as Lt 110 external diameter is an inscribed circle within the geometric plane figure.

In some exemplary embodiments, relay 300 may comprise a relay ferrite 319. Relay ferrite 319 can be a layer made of ferrite material similar to Tx-ferrite 119. One technical reason for utilizing the Relay ferrite 319 may be to provide a buffer for protecting the electronic circuitry of device 20 from inductive energy. Another technical reason for utilizing the relay ferrite 319 is to increase the magnetic field facing the Tx100; thus, increase the inductance of Lr 310. Relay ferrite 319 may possess properties similar to the properties of Tx-ferrite 119. Since Lr 310 may have a shape of a circle, the shape of relay ferrite 319 may also be a circle having a diameter equal to or bigger than the Lr 310 external diameter. Alternatively, relay ferrite 319 can have a shape of any geometric plane figure as long as Lr 310 external diameter is an inscribed circle within the geometric plane figure.

It should be noted that relay ferrite 319 may require a cutout situated at its center. The size of the cutout may be equal or slightly larger than an external diameter of a typical receiver coil of a chargeable device such as coil 22 of device 20. The shape of the cutout may be a circle or any geometric plane that surround coil 22 shape in order to allow magnetic flux to pass between Lr 310 and coil 22.

In some exemplary embodiments of the disclosed subject matter, the relay 300 further comprises a second relay ferrite 329 configured to block magnetic field induced by Lt 110 to sLr 320 and enhance the sLr 320 inductance toward coil 22. The second relay ferrite 329 possesses properties similar to the properties of Tx-ferrite 119 and relay ferrite 319. The shape ferrite 329 may be equal to or slightly larger than the cutout shape of relay ferrite 319. Practically, the cutout of relay ferrite 319 can be used as ferrite 329 that is situated inside the inner diameter of Lr 310 and at the same plane, while the sLr 320 may be situated on top of ferrite 229.

In some exemplary embodiments of the disclosed subject matter, at least one resonance capacitor (Ct) 130 can be connected in series to Lt 110 and at least one resonance capacitor (Cr) 330 may be connected in series to Lt 310. The resonant capacitors may be placed inside the inner diameter space of each coil accordingly. Alternatively, the resonant capacitors can be placed next to the outer diameter space of each coil accordingly, or elsewhere within the respected enclosure.

The relay ferrite 319 of the present disclosure increases the coupling factor of coil 22 and Lr 310 to better simulate a behavior of a coil 22 with commercially available standard transmission coil and also reduces any direct coupling from Lt 110 to coil 22, which is not desired in the system of the present disclosure. In addition, the resonance capacitors of both the Tx 100 and relay 300 are intended to stabilize the system operational point, dependency of coil 22 loads and allow for high efficiency in power transfer. In some exemplary embodiments, the resonance frequency of Lt 110 and Ct 130, (i.e. Tx 100 LC circuit) may be set to be significantly lower than the resonance frequency of a typical coil 22 (approximately 100 kHz) and substantially lower than the resonance frequency of Lr 310 and Cr 330 (i.e. relay 300 LC circuit).

In some exemplary embodiments, a combination of the Tx 100 and the relay 300 LC circuits, when no load is present, may form two distinct resonance frequencies, hereinafter, joint resonance frequencies (JRF). The first resonance frequency of JRF can be adjacent to Tx100 LC circuit's resonance frequency, however, in any case, it will be lower.

The second resonance frequency of JRF, can be adjacent to relay 300 LC circuit's resonance frequency, however, it will be higher. It should be noted that the phrase "a combination of the Tx 100 and the relay 300 LC circuits" refers in the present disclosure to a state where Tx 100 and relay 300 face each other, as depicted in FIG. 2, and power is applied to the Tx 100. It should also be noted that the second resonance frequency, i.e. higher resonance frequency, shall be regarded in the present disclosure system as main resonance frequency (MRF).

The resonance frequency of Tx 100 LC circuit and relay 300 LC circuit are designed in such way that their JRF, with no Coil 22 on them, is tuned to be of a specific range (typically 20-50 kHz) that is lower than the desired maximal OPF of the Tx 100 and is higher than coil 22 resonance frequency.

In one preferred exemplary embodiment, the inductance of Lt 110 can be approximately 30 µH; the capacitance of Ct 130 can be approximately 290 µF which provides a Tx 100 LC circuit's resonance frequency of approximately 54 kHz. Whereas, the inductance of Lr 310 can be approximately 60 µH; the capacitance of Ct 130 can be approximately 37.5 nF which provides a relay 300 LC circuit's resonance frequency of approximately 106 kHz. In such preferred exemplary embodiment, the system MRF can be 117 kHz (i.e. higher than 106 kHz of the relay 300 LC circuit's resonance frequency) providing that the gap between the installed relay 300 and the Tx 110 can be approximately 30 millimeters. Also, the outer diameter of Lt110 and Lr310 may be approximately 125 millimeters, whereas the outer diameter of Lr320 may be approximately 55 millimeters.

In some exemplary embodiments, an OPF ranges between 121 kHz-140 kHz, where the lower OPF of the range can be 4 kHz higher than the MRF, i.e. 117 kHz, and the maximal frequency can be 5 kHz lower than a regulatory limit, i.e. 145 kHz. Alternatively, the maximal OPF can be set below the MRF and the regulatory maximal frequency limit. For an installation having similar coils as in the example described herein above, with a medium thickness of 0.5", the MRF can be at 140 kHz. Thus, the operational range can be set to 115 kHz-136 kHz, were the maximal frequency is 4 kHz lower than the MRF and lower than the regulatory limit.

Figure 3:
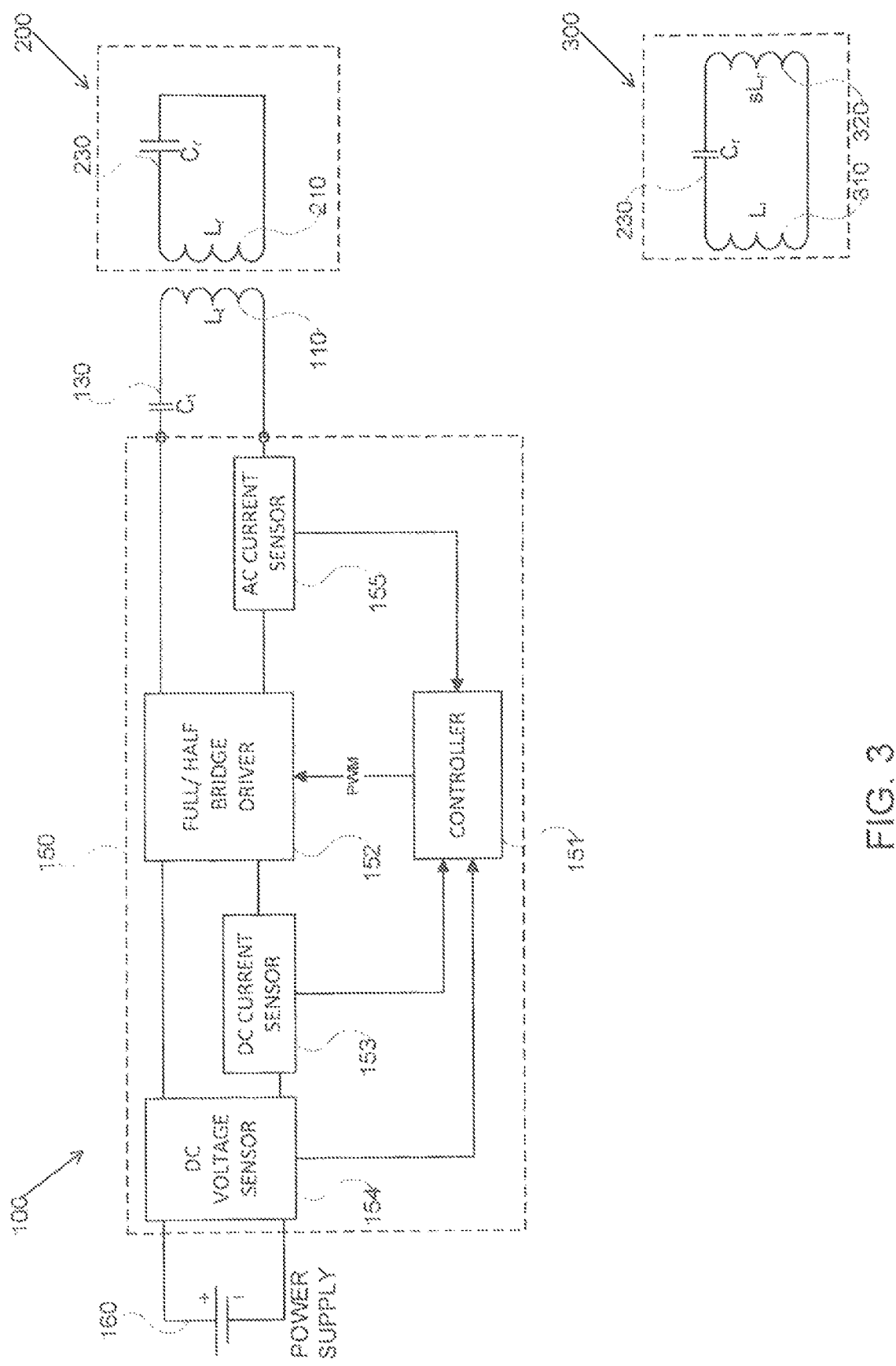
FIG. 3 shows a block diagram of a system for wireless power charging through medium, in accordance with some exemplary embodiments of the disclosed subject matter.

Referring now to FIG. 3 showing a block diagram of system for wireless power charging through medium, in accordance with some exemplary embodiments of the disclosed subject matter. The system for wireless power charging through medium comprises a PS 160, a Tx 100 transmitter and either a relay 200 or relay 300.

In some exemplary embodiments, the system can be adapted to utilize Tx 100 for charging a user's chargeable device, such as device 20 of FIGS. 1 and 2, via either a relay 200 or relay 300. Both relay 200 and relay 300 can be passive electronic circuit acting as repeaters for wirelessly transmitting charging energy to device 20 or the like. Relay 200 can comprise at least one coil (inductor) and one capacitor that form an LC resonance circuit, such as depicted in FIG. 1. An alternative relay, i.e. relay 300, can be provided in order to enhance the inductance and coupling with coil 22 of device 20. Relay 300 comprises at least two coils and one capacitor that form an LC resonance circuit such as the circuit depicted in FIG. 2.

In some exemplary embodiments, Tx 100 can comprise a transmitter electronics (Tx elect) 150, at least one Lx 110 coil, and a capacitor Ct 130, configured for inducing current in the coils of either relay 200 or relay 300, as depicted in FIG. 1 and FIG. 2 respectively.

In some exemplary embodiments, the Tx-elect 150 comprises of a controller 151; a full or half bridge driver 152, a DC current sensor 153, a DC voltage sensor 154, and an AC current sensor 155.

Controller 151 can be a central processing unit (CPU), a microprocessor, an electronic circuit, an integrated circuit (IC), or the like. Additionally, or alternatively, controller 151 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Controller 151 can be utilized to perform computations required by Tx 110 or any of its subcomponents.

In some exemplary embodiments of the disclosed subject matter, the controller 151 is configured to determine the following parameters:

a. DC voltage across PS 160 by acquiring and measuring an outcome of DC voltage sensor 154.
b. DC current supplied by PS 160 by acquiring and measuring an outcome of DC current sensor 153.
c. AC current supplied to Lt 110 by acquiring and measuring an outcome of AC current sensor 155. Alternatively, output AC current can be determined by sensing instantaneous current flowing to the driver from the power supply with DC current sensor 153.

It should be noted that determining parameters for AC current can comprise peak current, average of absolute current, RMS current, amplitude of first harmonic, and any combination thereof, or the like In some exemplary embodiments, controller 151 comprises a semiconductor memory component (not shown). The memory may be persistent or volatile memory, such as for example, a flash memory, a random-access memory (RAM), a programmable read only memory (PROM), a re-programmable memory (FLASH), and any combination thereof, or the like.

In some exemplary embodiments, the memory retains program code to activate controller 151 to perform acts associated with determining a pulse width modulation (PWM) signal that controls the full or half bridge driver 152. Driver 152 can adjust the output current flowing through Lt 110, i.e. power provided by the Tx 100, by modulating the OPF and/or duty cycle of the current flowing through Lt 110. In some exemplary embodiments, the PWM signal generated in the controller 151 tunes the modulation to satisfy the wireless charging needs of a load, such as device 20. In an alternative embodiment, the amplitude of the DC power supply may be controlled.

It should be noted that the PWM signal frequency and duty cycle can be set by controller 151, within the OPF range, as previously described. Additionally, controller 151 can change the OPF within the OPF range based on the power demand of the device 20.

In some exemplary embodiments, the controller 151 can utilize its memory to retain, connectivity software, monitoring information, configuration and control information and application associated with charging management of present disclosure system.

In some exemplary embodiments, the controller 151 can be configured to communicate with device 20 based on protocols that comply with the following communications standards: power matters alliance (PMA); wireless power consortium (WPC) and AirFuel Alliance. According to these communication methods, but not limited to, the controller 151 can be configured to acquire user's credentials from device 20 in order to authenticate users for granting and regulating charging services. Additionally, or alternatively, the controller 151 can be also configured to acquire from device 20, its power requirements.

For the sake of simplifying the explanation of the methods hereinafter, relay 200 and relay 300 are referred to as "relay", also coils Lr 210 and Lr 310 are referred to as "Lr". It should be noted that the following methods apply for both relay 200 and relay 300 and their respected subcomponents.

Some of technical problems dealt with by the disclosed subject matter is the effect of unknown installation environments on the actual JRF, the coupling factor between Tx 100 and the relay, and consequently determining the OPF. In spite of the fact that a desired JRF for Lt 110 and Lr coils can be defined in the design of the passive components, the actual JRF and the coupling factor can be impacted by different environments in each installation. For example, variables such as the gap between Lt 110 and Lr coils; magnetic/reactive elements placed near the coils; manufacturing variance of the passive components; material from which the medium is made of; and any combination thereof, or the like.

Some technical solutions are gained by preforming a dynamic calibration method executed by controller 151. The method comprises (but not limited to) determining JRF, calculating the coupling factor, and determining the ranges for OPF. In some exemplary embodiments, the dynamic calibration method can be executed when no load (device 20) is placed on the relay. Additionally, or alternatively, the dynamic calibration method can be executed with load placed on the relay; however, the device 20 doesn't supply power to its load.

Figure 4:
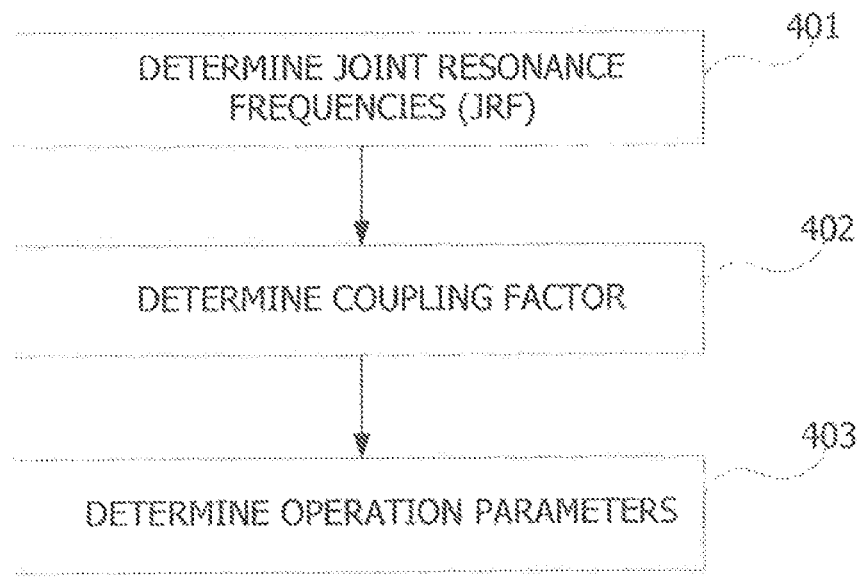
FIG. 4 shows a flowchart diagram of methods for self-calibration, in accordance with some exemplary embodiments of the disclosed subject matter.

Referring now to FIG. 4 showing a flowchart diagram of methods for self-calibration, in accordance with some exemplary embodiments of the disclosed subject matter.

In step 401, joint resonance frequencies (JRF) are determined. In some exemplary embodiments, the expected JRF can be calculated based on the selected resonance frequencies of the Tx 100 and LC resonance circuits as well as their coupling factor. In the case where no load is present on the relay, the impedance viewed from the Tx 110 side can be given by the following equation:

$$Ztotal = jwL_tY_t + R_r + \frac{w^2L_tL_rK_{tr}^2}{jwL_rY_r + R_r}$$

$$\text{Where, } Y_t = 1 - \left(\frac{w_t}{w}\right)^2 \text{ and } Y_r = 1 - \left(\frac{w_r}{w}\right)^2$$

$w_t$ designates the resonance frequency of the TX 100 and
$w_r$ designates the resonance frequency of the relay
w designates the operational frequency
$K_{tr}$ designates the coupling between coil Lt 110 to coil Lr
In some exemplary embodiments, the JRF can be calculated when Ztotal is minimal, thus:

$$\min\left|\left(jwL_tY_{pt} + R_t + \frac{w^2L_tL_rK_{tr}^2}{jwL_rY_r + R_r}\right)\right|,$$

and after neglecting parasitic resistances:

$$jwL_tY_t + \frac{w^2L_tL_rK_{tr}^2}{jwL_rY_r + R_r} = 0$$

Thus, the $Y_tY_r=K_{tr}^2$ expression resulting from simplifying the above equation, can be indicative of the minimum point. As an example, the resonance point of the Tx 100 can be set to a very low value, so $Y_p \cong 0.9$ and the coupling factor is $K_{pr} \cong 0.4$. As a result, $Y_r$ approximately equals to 0.18 and therefore, the MRF ($w_{jr}$), i.e. main resonance frequency, is approximately equal to $1.1w_r$, where $w_r$ is the resonance frequency of the relay.

In other exemplary embodiments, the expected JRF is determined by a frequency sweep technique. In the frequency sweep technique, controller 151 sets the power carrier amplitude to a minimum and performs a swipe across an expected OPF range. Subsequently, the controller 151 records the maximal voltage and current of Tx 100 LC resonance circuit for each of these frequencies, and determines the JRF to be the frequency at which highest voltage and or current was observed.

In step 402, a coupling factor is determined. It should be noted that the exact coupling factor (k) between the Tx 100 and the relay is required for determining the OPP in the system of the present disclosure. It should also be noted, as previously described, that k may be impacted by different environments factors of each installation, thus can vary from site to site and can't be based on the resonance frequency itself; therefore, it may be automatically determined on site. In some exemplary embodiments, the k determination can be based on frequency scanning and voltage or current measurement of Lt 110 as well as current phase with respect to driving signal.

In some preferred embodiments, controller 151 scans for the MRF, such as depicted in step 401, and selects two frequencies slightly off the MRF. Then, measures the current and its phase for these two points ($w_1$ and $w_2$). Based on these measurements, controller 151 calculates the complex impedance for the two points ($Z_1$ and $Z_2$). For the calculations, controller 151 obtains the inductance value of Lt 110 that preloaded in its memory. Additionally, or alternatively, the inductance value of Lt 110 can be derived by additional calibration procedures.

Based on the impedance equation discussed in step 401, the impedance (Z) viewed from the Tx 110 as expressed in the following equation can be utilized to extract k. It should be noted that in the measurements that were conducted at $w_1$ and $w_2$ points (angular frequencies), the value Z is comprised of $Z_1$ and $Z_2$ at these points.

$$img(Z) = wL_tY_t(w)\left(\frac{2-2Y_t(w)}{Y_t(w)} + \frac{2-2Y_r(w)}{Y_r(w)}\right)\frac{\Delta w}{w} =$$

$$L_ty_t(w)\left(\frac{2-2Y_t(w)}{Y_t(w)} + \frac{2 - \frac{2k^2}{Y_t(w)}}{\frac{k^2}{Y_t(w)}}\right)\Delta w$$

Where, $w_0$ indicates the MRF and $\Delta w = w_1 - w_2$ $$img(Z_2) - img(Z_1) = L_tY_t(w_0)\left(\frac{2 - \frac{2k^2}{Y_t(w_0)}}{\frac{k^2}{Y_t(w_0)}}\right)(w_2 - w_1)$$

$$k^2 = \frac{2L_tY_t^2(w_0)}{\frac{(img(Z_2) - img(Z_1))}{(w_2 - w_1)} + 2L_t^2}$$

In some exemplary embodiments, the relay resonance frequency is given by:

$$Y_r = 1 - \left(\frac{w_r}{w_0}\right)^2 = \frac{k^2}{Y_t} \quad w_r = w_0\sqrt{1 - \frac{k^2}{Y_t}}$$

Additionally, or alternatively, k is obtained by using the following equations:

$$Z(w) = iwL_t Y_t(w) + R_p + \frac{w^2 L_t L_r K_{tr}^2}{iwL_r Y_r(w) + R_r}$$

$$img(Z) \cong wL_p Y_p(w) - \frac{wL_t K_{tr}^2}{Y_r(w)}$$

$$F = (Y_t(w_2) * L_t * w_2 - Img(Z_2))/(Y_t(w_1) * L_t * w_1 - Img(Z_1)) = \frac{Y_r(w_1)}{Y_r(w_2)}$$

$$w_r = \sqrt{((F-1)/(F/(w_2^2) - 1/(w_1^2)))}$$

$$k = \sqrt{((Y_p(w_1) - Img(Z_1)/(w_1 * L_p)) * (1 - (w_r/w_1)^2))}$$

In some exemplary embodiments, the controller 151 uses integer divisions of a 48 Mhz clock as the driving clock. As an example, a minimal frequency step around a 125 kHz OPF, can be calculated to be 125 KHz-48 MHz/(48 MHz/125 KHz+1)=384 Hz. Based on this example, $w_1$ is MRF+384 Hz and $w_2$ is MRF-384 Hz.

In some exemplary embodiments, an alternatively method may be used for determining k. In this method, controller 151 uses the frequency sweep technique as discussed in depicting step 401, in order to determine the lower frequency $f_{j1}$ and higher frequency $f_{j2}$ of the JRF, as they may be expressed at maximal current of Lt 110. Additionally, or alternatively, controller 151 uses the same frequency sweep technique to determine the resonance frequency $f_r$ of the Lr, which may occur at or near the minimal current of Lt 110. It should be noted that the resonance frequency of Lt 110 ($f_t$) is assumed to be known based on calculation or based on factory calibration. In some exemplary embodiments, k is derived from the following equations:

$$\left(1 - \left(\frac{f_{j1}}{f_t}\right)^2\right) * \left(1 - \left(\frac{f_{j1}}{f_r}\right)^2\right) = k^2$$

$$\left(1 - \left(\frac{f_{j1}}{f_t}\right)^2\right) * \left(1 - \left(\frac{f_{j2}}{f_r}\right)^2\right) = k^2$$

$$\frac{1 - \dfrac{k^2}{\left(1 - \left(\frac{f_{j1}}{f_r}\right)^2\right)}}{1 - \dfrac{k^2}{\left(1 - \left(\frac{f_{j2}}{f_r}\right)^2\right)}} = \left(\frac{f_{j1}}{f_{j2}}\right)^2$$

$$k^2 = \frac{1 - \left(\frac{f_{j1}}{f_{j2}}\right)^2}{\dfrac{1}{\left(1 - \left(\frac{f_{j1}}{f_r}\right)^2\right)} - \dfrac{\left(\frac{f_{j1}}{f_{j2}}\right)^2}{\left(1 - \left(\frac{f_{j2}}{f_r}\right)^2\right)}}$$

In step 403, operation parameters are determined. In some exemplary embodiments, the operation parameters comprise an OPF range, duty-cycles, initializing ping frequency (ping), an OPF range direction (DIR), and any combination thereof, or the like.

It should be noted that commercially available wireless power transmission systems use specific predetermined operating frequency, amplitude, and duty cycle range. These systems work on the assumption that loads, such as device 20, have known and bounded properties. Therefore, these system's specific operational parameters are based on transmitter specific resonance as well as physical coil topology, which may be suitable for the load.

In oppose to that, the architecture of the present disclosure is characterized by splitting the transmitting functionality between Tx 100 and relay 200/300. Therefore, the operation parameters are installation-dependent that may vary from site to site; and thus, may be determined automatically in each installation.

In some exemplary embodiments of the disclosed subject matter, controller 151 utilizes the coupling factor k, JRF, and MRF, obtained in steps 401 and 402 for determining the operation parameters. It will be understood that k and JRF ($f_{j1}$; $f_{j2}$) can be indicative of the specific installation properties as well as component tolerances. The operational range for the specific device as installed can be calculated based on the above parameters.

In some exemplary embodiments, an operating frequency (OPF) range can be determined. The OPF range of Tx 100 can be bounded between a minimal operating frequency (F min) and a maximal operating frequency (F max). The OPF range can be determined based on $f_{j2}$ and k that were obtained in the previous steps, wherein F min and F max can be selected as specific offset from k dependent, $f_{j2}$. In some exemplary embodiments, the offset (DIR) of the OPF range (i.e. $f_{min}$ and $f_{max}$) can be either positive or negative. A positive DIR indicates that the OPF range is higher than $f_{j2}$, whereas negative DIR indicates that the OPF range is lower than $f_{j2}$.

In one exemplary embodiments, the DIR sign can be determine based on the following criteria DIR=1 if k<0.5 and DIR=−1 if k≥0.5. Additionally, or alternatively, DIR can be negative for keeping F max below a specific frequency Ftop that indicates a regulatory maximal frequency for wireless power transmission In preferred exemplary embodiments, the OPF range can be determined based on the following equations:

$$f_{min} = f_{j2} * \text{Dir} * (k * c1 + c2)$$

$$f_{max} = f_{j2} * \text{Dir} * (k * c3 + c4)$$

Where, c1, c2, c3, c4 are constants, retained in controller 151 memory, indicating specific min. and max. voltages profiles for different load types.

In some exemplary embodiments, the frequency of the initializing ping can be within the range of the selected F min to F max and can be determined based on the following equation $$f_{ping} = f_{j2} * \text{Dir} * (k * c5 + c6)$$

C5 and C6 are also constants, retained in controller 151 memory, and adapted to generate an Fping in the range of $f_{min}$ and $f_{max}$, while satisfying requirement for generating specific voltage on a typical load placed on designated location of the charging surface. In some exemplary embodiments, generating specific voltage on a typical load can be adapted to avoid damaging of any expected load while ensuring enough voltage for proper operation of all expected loads.

Additionally, or alternatively, supplementary protection methods can be provided prior to executing the ping in order to avoid potential damage to objects that are placed on the relay or near the Tx 100.

In some exemplary embodiments, an operation duty-cycle range can be defined. An operation duty-cycle range can be bounded between a minimal operation duty-cycle (D min) and a maximal operation duty-cycle (D max) based on coupling factor k. The duty-cycle can dictate the Tx 100 output power by means of the PWM signal that controls the full/half bridge driver 152. An allowed duty cycle range ($D_{min}$ to $D_{max}$) can be defined for the full OPF range, or include single range for all OPF range excluding F min and F max, for which it may have a different range, or may have a different range defined for each of the OPFs or frequency ranges.

It will be appreciated that specific threshold values relation to coupling factor k and JFR can be derived for detection of specific voltage, current threshold of abnormal operation, over voltage, over current, foreign object detection, and any combination thereof, or the like.

It will also be appreciated that any other relation between coupling factor k and JFR can be derived for obtaining additional parameters indicative of a load being charged. For example: Q factor, maximal power, coil inductance, rectified voltage target, and any combination thereof, or the like. Any of these parameters or their combinations may impact the definition of the OPF.

It will also be appreciated that since the present disclosure system was designed to operate on a specific coupling factor range, detection of installation that provides coupling factor outside of the designated range (higher or lower) would be important. The installer can then be alerted and take the appropriate action to mitigate the problem. For a coupling factor that is higher than the maximal allowed coupling factor, the installer can add a spacer to the bottom unit installation or install the lower and upper coils with a slightly shifted position for reducing the coupling factor. In cases where the coupling factor is too low, the installer can select a thinner medium 10 or use a higher voltage power supply or larger coils to compensate for the wide gap and low coupling. The determined coupling factor can also be backward translated to the specific gap between Lt 110 and Lr.

The components detailed above may be implemented as one or more sets of interrelated computer instructions, executed for example by controller 151 or by another processor. The components may be arranged as one or more executable files, dynamic libraries, static libraries, methods, functions, services, or the like, programmed in any programming language and under any computing environment.

The present disclosed subject matter may be a system, a method, and/or a computer program product. The computer program product may include a computer readable storage medium (or media) having computer readable program instructions thereon for causing a processor to carry out aspects of the present disclosed subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter.

Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A dynamic calibration method in a system comprising a relay, having a coil, adapted to inductively transfer power for wirelessly charging a device and a transmitter, having a coil and a controller configured to inductively transmit to the relay the power for wirelessly charging the device, wherein the transmitter and the relay are separated by a medium, the method comprising:
   determining a coupling factor, k, between the coil of the transmitter and the coil of the relay, wherein the coupling factor, k, is determined based on joint resonance frequencies, $f_{j1}$, $f_{j2}$ between the coil of the transmitter and the coil of the relay; and
   determining an operating frequency range, having a minimal operating frequency, $f_{min}$, and a maximal operating frequency, $f_{max}$, based on the coupling factor, k.

2. The method of claim 1,
   wherein the operating frequency range is determined based on the joint resonance frequency $f_{j2}$, and an offset indicating that the operating frequency range is higher or lower than $f_{j2}$.

3. The method of claim 1, further comprising:
   operating the transmitter while sweeping the operating frequency and measuring an output alternating current (AC) for each operating frequency.

4. The method of claim 2, wherein the operating frequency range is determined based on:

$$f_{min} = f_{j2} * \text{Dir} * (k*c1 + c2); \text{ and}$$

$$f_{max} = f_{j2} * \text{Dir} * (k*c3 + c4),$$

where Dir is positive or negative to indicate that the operating frequency range is respectively higher or lower than $f_{j2x}$, and where c1, c2, c3, and c4 are constants retained in memory of the controller indicating specific minimum and maximum voltage profiles for different load types.

5. The method of claim 4, wherein Dir=1 if k<0.5 and Dir=−1 if k≥0.5.

6. The method of claim 1, wherein a ping frequency is determined as a function of the coupling factor, k and a joint resonance frequency, $f_{j2}$.

7. A method for inductively transferring power for wirelessly charging a device, the method comprising:
   determining a coupling factor, k, between a coil of a transmitter and a coil of a relay, wherein the coupling factor, k, is determined based on joint resonance frequencies, $f_{j1}$, $f_{j2}$ between the coil of the transmitter and the coil of the relay;
   determining an operating frequency range, based on the coupling factor, k;
   inductively transmitting power from the transmitter to the relay; and
   inductively transferring, from the relay to the device, power for charging the device, in accordance with the operating frequency range, wherein the transmitter and the relay are separated by a medium.

8. The method of claim 7, further comprising:
    determining a ping frequency which matches one or more requirements of the device.
9. The method of claim 7, the operating frequency range is bounded by minimal and maximal operating frequencies, $f_{min}$ and $f_{max}$, respectively, wherein the operating frequency range is determined based on a joint resonance frequency $f_{j2}$, and an offset indicating that the operating frequency range is higher or lower than $f_{j2}$.
10. The method of claim 7, further comprising:
    operating the transmitter while sweeping the operating frequency and measuring an output AC current for each operating frequency.
11. A charging system comprising:
    a transmitter;
    a relay;
    circuitry configured to determine a coupling factor, k, between a coil of the transmitter and a coil of the relay, wherein the coupling factor, k, is determined based on joint resonance frequencies, $f_{j1}$, $f_{j2}$ between the coil of the transmitter and the coil of the relay;
    circuitry configured to determine an operating frequency range, based on the coupling factor, k;
    the transmitter configured to transmit power to the relay; and
    the relay configured to inductively transfer power to charge a device, in accordance with the operating frequency range, wherein the transmitter and the relay are separated by a medium.
12. The charging system of claim 11,
    wherein the operating frequency range is bounded by minimal and maximal operating frequencies, $f_{min}$ and $f_{max}$, respectively, wherein the operating frequency range is determined based the joint resonance frequency $f_{j2}$, and an offset indicating that the operating frequency range is higher or lower than $f_{j2}$.
13. The charging system of claim 11, further comprising:
    circuitry configured to operate the transmitter and sweep an operating frequency within the operating frequency range; and
    circuitry configured to measure an output AC current for each operating frequency.

* * * * *